March 2, 1971     W. J. QUINLAN ET AL     3,566,432
WINDSHIELD WIPER SQUEEGEE
Filed Jan. 17, 1969     2 Sheets-Sheet 1

INVENTORS
William J. Quinlan &
Lawrence L. Huver

BY Munson H Lane
ATTORNEY

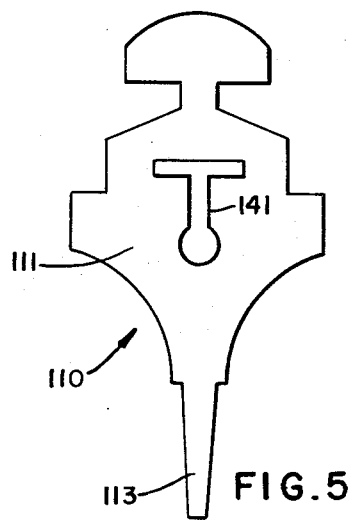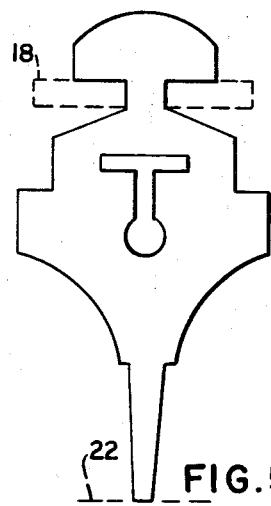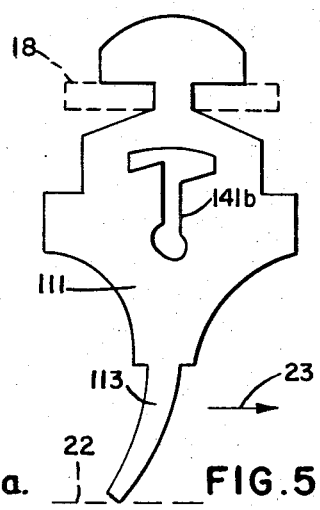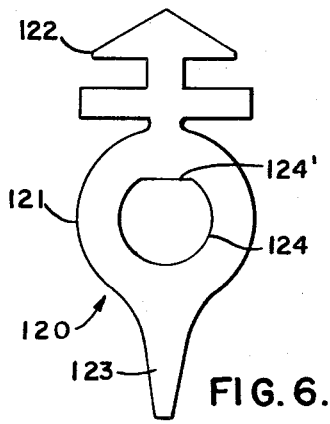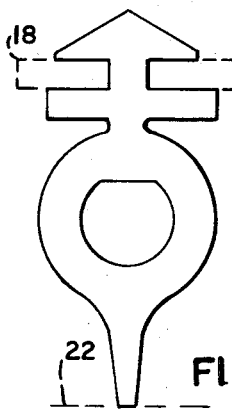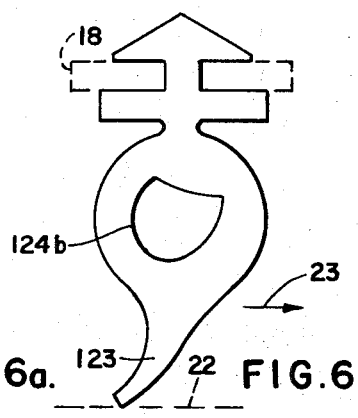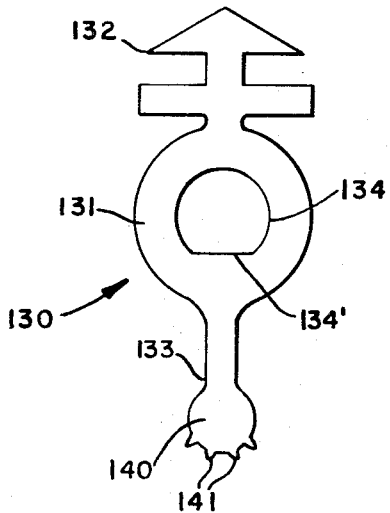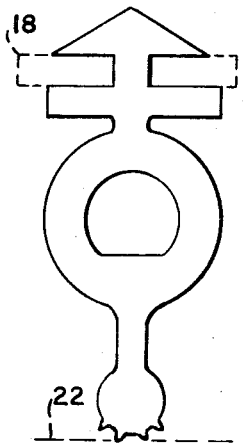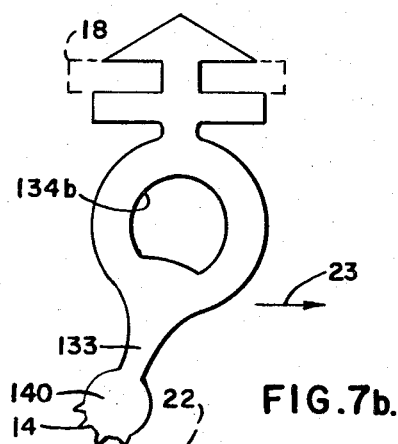

United States Patent Office 3,566,432
Patented Mar. 2, 1971

3,566,432
WINDSHIELD WIPER SQUEEGEE
William J. Quinlan and Lawrence L. Huver, Hastings, Mich., assignors to Hastings Manufacturing Company, Hastings, Mich.
Filed Jan. 17, 1969, Ser. No. 792,096
Int. Cl. B60s 1/32, 1/28; A47l 1/02
U.S. Cl. 15—250.36                    9 Claims

ABSTRACT OF THE DISCLOSURE

A squeegee component of a windshield wiper blade, the squeegee having an elongated elastomeric body with a longitudinal mounting portion and a longitudinal wiping lip. The body is progressively narrower in the direction of the lip and is provided in its relatively wide portion with a longitudinal hollow core. The core is deformable in cross-section to correspondignly deform and vary the resiliency of portions of the body surrounding the core, as a function of changes in wiping forces at the lip.

---

This invention relates to new and useful improvements in windshield wiper blades, and more particularly in the squeegee component of such blades, the squeegee component being mounted and held by stays of the blade superstructure.

The principal object of the invention is to provide a windshield wiper squeegee which will effectively wipe a flat or a curved windshield surface, which will have proper inherent resiliency to flex equally in both the up stroke and the down stroke of the wipe, and which will properly conform to various windshield curvatures.

Another important object of the invention is to provide a squeegee having a resiliently deformable cushion area in the body thereof between its mounting portion and its wiping lip.

These objects are attained by providing the body of the squeegee with a longitudinally extending hollow core, the cross-section of which is deformable by changes in wiping forces at the lip, so that portions of the body surrounding the hollow core are correspondingly deformed and afford resilient cushioning which effectively serves to maintain the wiping lip in proper contact with the windshield surface, as well as to properly hold the squeegee body in the mounting stays of the blade superstructure. Thus, when pressure from the superstructure is transferred through the squeegee, the resulting force of contact of the wiping lip with the windshield is absorbed by the resilient action afforded by the hollow core, and this allows varying pressures and curvatures along the wiping lip to be stabilized.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 5 is an end view of another embodiment in a relaxed position;

FIG. 5a is an end view of the embodiment of FIG. 5 applied to a windshield;

FIG. 5b is an end view similar to FIG. 5a but showing deformation of the squeegee in one wiping direction;

FIG. 6 is an end view of another embodiment;

FIG. 6a is an end view of the embodiment of FIG. 6 applied to a windshield;

FIG. 6b is an end view similar to FIG. 6a but showing deformation of the squeegee in one wiping direction;

FIG. 7 is an end view of another modified embodiment;

FIG. 7a is an end view of the embodiment of FIG. 7 applied to a windshield; and

FIG. 7b is an end view similar to FIG. 7a but showing deformation of the squeegee in one wiping direction.

Figure 2:
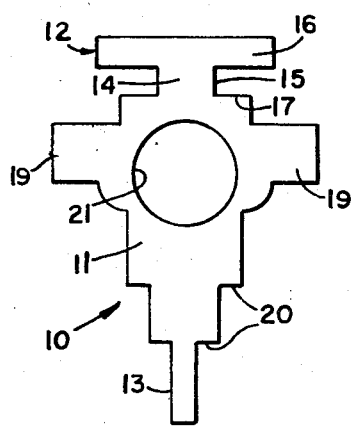
FIG. 2 is an enlarged end elevational view showing one embodiment of the squeegee in a relaxed position.
Figure 1:
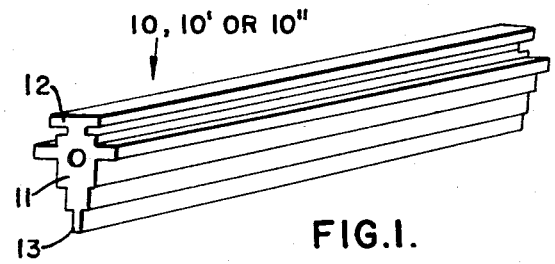
FIG. 1 is a fragemntary perspective view of a typical squeegee of the invention on a reduced scale.

Referring now to the accompanying drawings in detail and more particularly to FIGS. 2, 2a, 2b, these show end elevational views of a squeegee 10 under different conditions as hereinafter described. It will be understood, of course, that the squeegee is formed integrally from any suitable elastomeric material and is elongated as exemplified by the typical representation in the perspective view of FIG. 1, which shows one end portion of a typical squeegee.

The squeegee 10 has a main body portion 11, a mounting portion 12, and a wiping lip 13. The mounting portion 12 is defined by a restricted neck 14 between longitudinal grooves 15 at opposite sides of the mounting portion, and an enlarged head 16 above the grooves. The lower edges of the grooves 15 provide shoulders 17, and the grooves are adapted to receive mounting stays, indicated by the dotted lines 18, of the conventional wiper blade superstructure, which need not be referred to in detail here.

Below the shoulders 17, the squeegee body 11 is relatively wide and includes laterally projecting arms 19. From there the body 11 is progressively narrower in the downward direction, that is, toward the wiping lip 13, which may be achieved by forming the body with one or more steps, as indicated at 20.

The essence of the invention resides in providing the squeegee body with a hollow, longitudinally extending core 21, this being formed in the upper, relatively wider portion of the body, as for example, between the arms 19. When the squeegee is relaxed, that is, not in contact with a windshield, as shown in FIG. 2, the core 21 may have a substantially circular or truly circular cross-section.

Figure 2A:
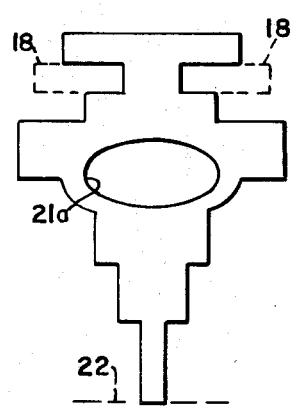
FIG. 2a is an end view of the squeegee of FIG. 2 applied to a windshield.

When the squeegee is applied to a windshield, indicated by the dotted line 22 in FIG. 2a, the pressure of the blade superstructure acting through the stays 18 causes the body 11 of the squeegee to become somewhat compressed, with the result that the circular core 21 becomes transversely elongated or elliptical as in FIG. 2a wherein the elliptical core is designated as 21a. Moreover, during the wiping stroke of the blade, for example in the direction of the arrow 23 in FIG. 2b, a lateral deflection of the wiping lip 13 acts through the squeegee body 11 so as to further deform the cross-section of the core into what becomes a pear-shape, as shown at 21b in FIG. 2b, it being noted that the larger end portion of the pear-shaped core faces the direction 23 of the wipe. At the same time, the smaller trailing end portion of the pear-shaped core forces the adjacent shoulder 17 upwardly against the associated stay 18 of the superstructure, and this action helps to control the amount of rollover of the blade.

It will be also apparent that the deformable core under wiping pressure correspondingly alters or deforms the cross-section of the squeegee body, particularly around the core, so that the resilient body attains increased strength in some areas or is weakened in others, for providing a most efficient cushioning action under various amounts of wiping pressure and windshield curvatures to assure proper contact of the wiping lip 13 with the windshield along the entire length of the blade. It will be appreciated that the core deformation and cushioning action also depend upon the type and inherent resiliency of the elastomeric material from which the squeegee is made, such material being selected to produce the optimum results.

Figure 2B:
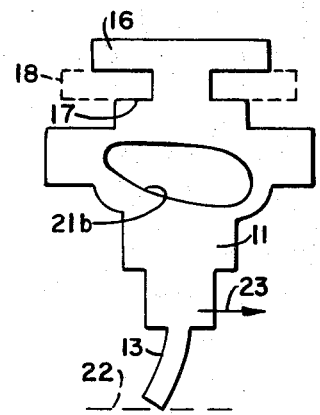
FIG. 2b is an end view similar to FIG. 2a but showing deformation of the squeegee in one wiping direction.

When the wiping stroke is in the opposite direction to the arrow 23, the core deformation is reversed so that it becomes a mirror image of that shown in FIG. 2b. When the wiper blade is "parked" on a flat section of the windshield, the squeegee core returns to the position shown in FIG. 2a, which the core also assumes momentarily during operation while the wiping direction of the blade is being reversed.

Figure 3:
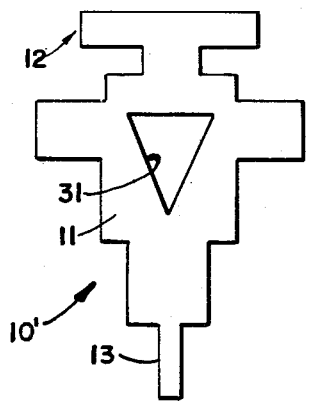
FIG. 3 is an end view showing another embodiment of the squeegee in a relaxed position.
Figure 3A:
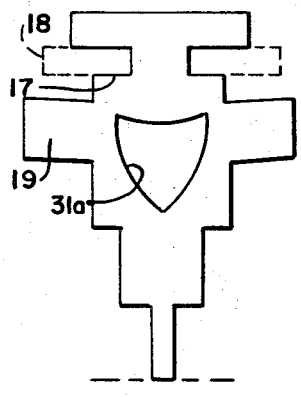
FIG. 3a is an end view of the squeegee of FIG. 3 applied to a windshield.
Figure 3B:
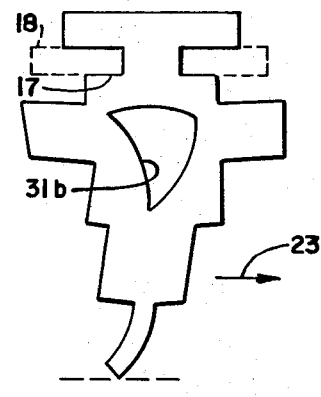
FIG. 3b is an end view similar to FIG. 3a but showing deformation of the squeegee in one wiping direction.

FIGS. 3, 3a and 3b show a modified embodiment of the squeegee designated generally as 10' which is substantially the same as the embodiment 10 just described, except that the hollow core 31 in the relaxed position is triangular rather than circular, the base of the triangle being adjacent the mounting portion and the apex adjacent the wiping lip of the squeegee. When the squeegee is applied to the windshield as in FIG. 3a, the triangular core 31 is deformed as at 31a, with the base of the triangle becoming convex and its sides becoming concave, and the resultant deformation of the squeegee body urges the arms 19 upwardly and forces the shoulders 17 against the stays 18 of the superstructure.

When the blade moves in a wiping direction, as for example at 23 in FIG. 3b, the triangular core is deformed further in that its base and one of its sides becomes concave while the other of its sides becomes convex, the convex side being the trailing side of the core with reference to the wiping direction 23. Inherently, the center of the triangular core is shifted in the wiping direction, and the resultant deformation of the squeegee cross-section increases the pressure of the trailing shoulder 17 against the associated stay 18 of the blade superstructure, thus further assisting in holding the squeegee in place.

Figure 4:
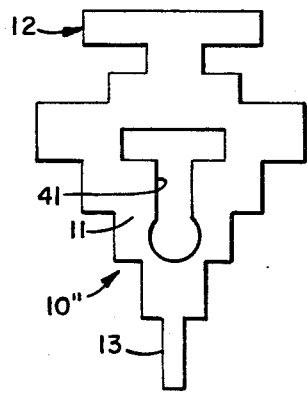
FIG. 4 is an end view showing another embodiment of the squeegee in a relaxed position.
Figure 4A:
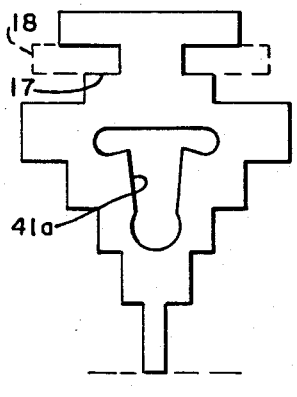
FIG. 4a is an end view of the squeegee of FIG. 4 applied to a windshield.
Figure 4B:
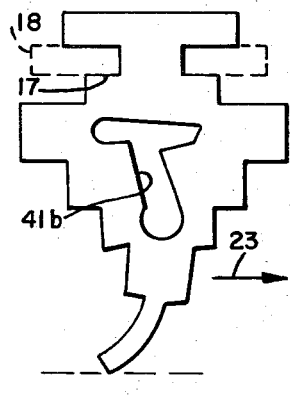
FIG. 4b is an end view similar to FIG. 4a but showing deformation of the squeegee in one wiping direction.

FIGS. 4, 4a and 4b show another modified embodiment designated generally as 10" which differs from the embodiments 10 and 10' mainly in that the hollow core 41 in the relaxed position of FIG. 4 is substantially T-shaped, with a bulbous lower end, the transverse part of the T being adjacent the mounting portion and the bulbous lower end being adjacent the wiping lip of the squeegee.

When the squeegee is applied to the windshield as in FIG. 4a, the T-shaped core 41 becomes deformed as at 41a, so that the ends of the transverse portion of the T become rounded and narrowed, while the vertical or stem portion of the T is upwardly widened, substantially as shown, with the result that the body shoulders 17 are urged more firmly against the superstructure stays 18, to properly hold the squeegee in place and prevent excessive roll-over of the blade.

When the blade moves in a wiping direction, as for example in the direction of the arrow 23 in FIG. 4b, the T-shaped core is further deformed as at 41b, so that the leading side of the T in the wipe direction becomes pulled downwardly and the trailing side is somewhat raised, thus again urging the adjacent shoulder 17 at the trailing side into a firm engagement with the associated stay 18. At the same time, the resilient cushioning of the squeegee body, under deformation facilitated by the T-shaped core, assures proper contact of the wiping lip with the windshield along the full length of the blade.

FIGS. 5, 5a and 5b show another modified embodiment of the squeegee designated generally as 110, which is similar to the embodiment 10" of FIGS. 4, 4a, 4b in that its body portion 111 is provided with a substantially T-shaped core 141 having a bulbous lower end. However, instead of being stepped in the direction of the wiping lip 113, the sides of the body portion 111 are concaved substantially as shown, whereby the body portion becomes narrower in the downward direction. When the squeegee is applied to the windshield and moves in a wiping direction, for example in the direction of the arrow 23, the wiping lip 113 becomes flexed and the body portion 111 becomes deformed so that the core 141 assumes a deformed form as indicated at 141b in FIG. 5b.

Another modification of the squeegee designated generally as 120 is shown in FIGS. 6, 6a and 6b. The same includes a substantially cylindrical body portion 121 with a mounting portion 122 and a wiping lip 123, the body portion 121 being provided with a hollow core 124 which is nearly circular in cross-section but has a flat wall portion 124' adjacent the mounting portion 122. When the squeegee moves over a windshield, as in the wiping direction 23, the wiping lip 123 is flexed and the body portion 121 is deformed, thus deforming the core as indicated at 124b in FIG. 6b.

Finally, FIGS. 7, 7a and 7b illustrate another modified embodiment designated at 130 which is similar to the embodiment 120 in FIGS. 6, 6a and 6b, except that the flat wall portion 134' of the nearly circular core 134 is disposed adjacent the wiping lip 133, rather than adjacent the mounting portion 132. The deformed position of the body portion 131 and of the core 134 is shown at 134b in FIG. 7b.

The embodiment of FIGS. 7, 7a, 7b also presents another feature in that the wiping lip 133 is provided with a substantially cylindrical wiping edge 140, whereby the wiping lip is substantially reinforced but is sufficiently flexible to conform to various windshield curvatures with an efficient wiping action, the latter being enhanced by providing the cylindrical wiping edge 140 with a set of longitudinally extending serrations or ribs, as indicated at 141. Although the wiping edge structure 140, 141 is shown only with the embodiment 130 of FIGS. 7, 7a, 7b, it is to be understood that the same may also be used with any or all of the other embodiments herein disclosed, that is, the embodiments 10, 10', 10", 110 and 120, of FIGS. 2, 3, 4, 5 and 6, respectively.

In all embodiments of the invention it is possible to place the neutral axis of the squeegee closer toward the wiping lip, by utilizing cores of various shapes for various types of squeegee material, while still maintaining the upper portion of the body 11 of sufficient thickness to effectively resist lateral bending.

It may also be noted that the wiping lip 13 has an adequate length and thickness so as to support the superstructure of the blade in a parked position while still allowing a proper amount of flexing for a good wiping pattern.

By the term "elastomeric material" as used in this specification, it will be understood that natural rubber and natural rubber compositions as well as synthetic polymers and compositions having rubber-like properties are intended to be included, such for example, as butyl rubber, polyurethane rubber, silicone rubber and the like.

What is claimed as new is:

1. A squeegee component of a windshield wiper blade, said component being of elastomeric material and comprising (1) an upper longitudinal mounting portion including a reduced neck portion, and (2) a lower elongated main body portion having a downwardly extending longitudinal wiping lip, said main body portion being progressively narrower in cross-section in the direction of said wiping lip and being provided in its relatively wide upper portion with a single longitudinally extending hollow core formed therein, said core being of substantially greater maximum transverse width than said reduced neck portion and being capable of cross-sectional deformation to correspondingly deform and vary the resiliency of the body portions surrounding said core as a function of changes in direction and pressure of wiping forces at said lip, said mounting portion including blade superstructure stay receiving grooves defining a reduced neck therebetween with an enlarged head and shoulders respectively above and below said grooves, deformation of said core and said body portions being effective to urge said shoulders toward said head and into pressing engagement with stays in said grooves.

2. The device as defined in claim 1 wherein the upper portion of said body below said mounting portion includes laterally projecting arms and is relatively wide by virtue of said arms.

3. The device as defined in claim 1 wherein said hollow core normally is of a substantially circular cross-section.

4. The device as defined in claim 2 wherein said hollow core normally is an inverted isosceles triangle in cross-section, the base of the triangle being located intermediate the laterally projecting arms and the apex extending into the relatively reduced body portion below said arms.

5. The device as defined in claim 2 wherein said hollow core normally is of a substantially T-shaped cross-section, including a head portion intermediate said laterally projecting arms and the leg portion substantially perpendicular to said head portion and extending downwardly therefrom.

6. The device as defined in claim 1 wherein said hollow core normally is of a nearly circular cross-section but includes a flat wall portion disposed adjacent the mounting portion of said body.

7. The device as defined in claim 1 wherein said hollow core normally is of a nearly circular cross-section but includes a flat wall portion disposed adjacent said wiping lip.

8. The device as defined in claim 1 wherein said wiping lip includes a substantially cylindrical wiping edge provided with longitudinal serrations.

9. A squeegee component of a windshield wiper blade, comprising an elongated elastomeric body including a longitudinal mounting portion and a longitudinal wiping lip, said body being progressively narrower in cross-section in the direction of said wiping lip and being provided with a longitudinally extending hollow core, capable of cross-sectional deformation to correspondingly deform and vary the resiliency of the body portions surrounding said core as a function of changes in direction and pressure of wiping forces at said lip, the upper portion of said body below said mounting portion including laterally projecting arms and being relatively wide by virtue of said arms, said hollow core being normally of a substantially T-shaped cross-section including a laterally extending head portion and a leg portion normal to the head portion, the head portion of such T-shaped core being mounted within said wide upper portion intermediate said laterally projecting arms and substantially parallel thereto and said leg portion extending away from the mounting portion into a relatively narrower portion thereof.

References Cited
UNITED STATES PATENTS

| | | | |
|---|---|---|---|
| 2,011,015 | 8/1935 | Schleicher | 15—250.41X |
| 2,102,188 | 12/1937 | Romano | 15—250.41X |
| 2,295,011 | 9/1942 | Rodrick | 15—250.41X |
| 3,048,872 | 8/1962 | Kerrigan | 15—250.36 |
| 3,428,997 | 2/1969 | Rickett | 15—250.36 |

PETER FELDMAN, Primary Examiner

U.S. Cl. X.R.

15—250.41